June 10, 1947.  G. A. CROWTHER  2,421,834
RECORDING MECHANISM
Filed Sept. 12, 1942  2 Sheets-Sheet 2

INVENTOR
GEORGE A. CROWTHER
BY
ATTORNEY

Patented June 10, 1947

2,421,834

UNITED STATES PATENT OFFICE 2,421,834

RECORDING MECHANISM

George A. Crowther, Manhasset, N. Y., assignor to Ford Instrument Company, Inc., Long Island City, N. Y., a corporation of New York Application September 12, 1942, Serial No. 458,159

13 Claims. (Cl. 234—5.5)

This invention relates to selector mechanisms and particularly to selector mechanisms as applied to data recorders which automatically record, on a single chart, data received from several sources. The data received may represent values of functions of the same nature existing at various observing points or it may represent values of different functions existing at one or more observing points.

My invention relates particularly to selecting mechanisms for recorders which suitably are connected electrically to various observing points although mechanical connecting means may be used and means for utilizing them are shown.

One of the objects of my invention is to provide means for actuating the selector mechanism so that only the data received from currently selected stations is recorded.

Another object of my invention is to provide means for controlling the operation of the selecting mechanism from the various observing points.

A further object of my invention is to provide means at the observing points to indicate to the operator at each point that the data being transmitted from that point has been selected and recorded.

Another object of my invention is to provide means for printing successive records at a high rate of speed, the time interval between recordings being dependent primarily upon the time required for the recorder to be positioned at the point on the chart representing the value which it is desired to record.

Still other objects of the invention will be evident from the following description.

For the purpose of illustration the invention is shown as applied to a plotter for recording ranges used in connection with a gun fire control system. As illustrated the ranges from several range finder stations are transmitted electrically to the plotting mechanism where they are recorded under the selective control of the range finder operators at the various stations or observing points. The present and advance range values as determined by a computing mechanism such as a range keeper are also plotted periodically under control of a mechanical connection from the computer direct to the plotter mechanism. Additionally, selected computed ranges, such as the range existing at the time of firing a salvo, may be selectively plotted.

The electric transmitting circuits leading from synchronous angle transmitters at the range finders to synchronous repeaters at the recording station are connected at the recording station to a multi-position, multipole rotary selector switch by which each of the circuits is successively connected to a single repeater unit which may include either a single receiver motor or coarse and fine receiver motors. The motor or motors of the repeater unit are connected to position the recorder relative to the record sheet in accordance with the data or range being received. This positioning of the recorder may be by a direct mechanical connection from the receiver motor to the recorder or through a relay or servomotor under the control of the receiver motor or motors of the repeater unit.

A rotary multi-position recording wheel or marker is provided on which each character corresponds to a position of the selector switch and the circuit connected thereto. The selector switch and recording wheel are connected by shafting so that the character of the recorder which is in position for recording, represents the circuit which is connected to the repeater unit through the selector switch.

The selector switch and the recorder are urged to rotate continuously by a motor connected thereto through a slip coupling.

The shafting which rotates the selector switch and recorder also rotates a selector or detent wheel which has a notch corresponding to each position of the switch and recorder. A solenoid when energized actuates a locking plunger cooperating with the detent wheel to lock the switch and recorder and hold them while the value received from a selected observing point is being recorded. During this time the slip connection permits the motor to rotate continuously but with a drag effect which will cause the recorder and selector switch to rotate to the position representing the next selected station or observing point as soon as the locking plunger is released. If no ranges are to be recorded the selector switch blade and the recording wheel will rotate continuously.

The selector solenoid is connected through the selector switch to a push button or energizing switch at each of the observing points. When the energizing switch at one of the range finders or observing points is closed, the circuit to the solenoid will be closed as soon as the rotating selector switch comes to the position representing that station. The solenoid will then actuate the locking plunger to hold the selector switch and recorder on the position representing that station or range finder until the data being transmitted by that station has been recorded. To accomplish the recording the receiver motor controls the movement of the recorder to the position representing the received data, when the recorder is actuated automatically to record the data. At the same time that the record is being made, a circuit is energized which actuates a signal, such as a buzzer or light, at the corresponding station. As soon as the record has been made the detent wheel is released and the selector moves on to the next selected station.

An embodiment of the invention satisfying the above and other objects is illustrated in the accompanying drawings, in which:

Fig. 3 shows a holding relay of the selector operating mechanism in its holding position.

Figure 1:
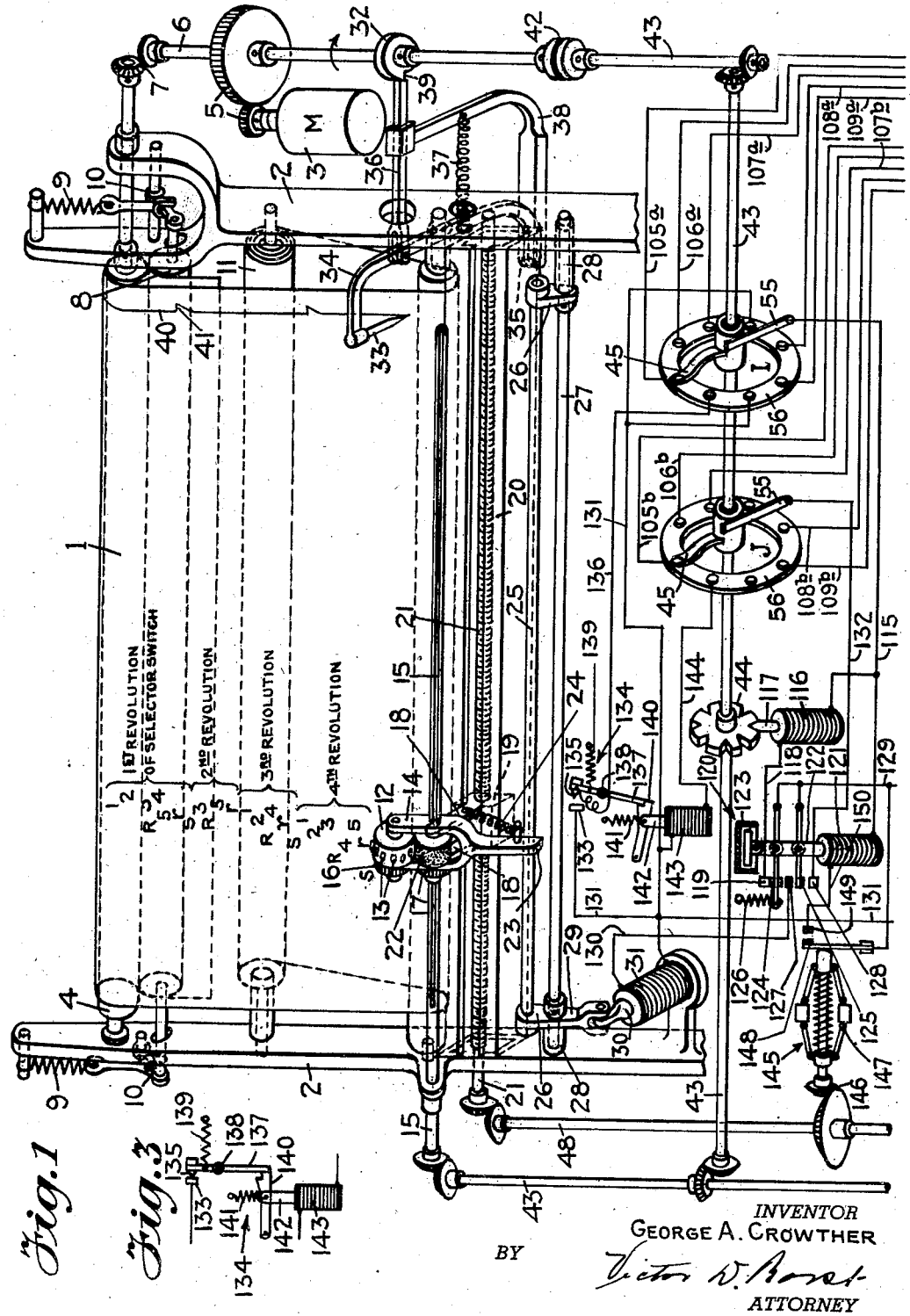
Fig. 1 shows diagrammatically the recording mechanism, part of the selector switch, and the selector operating mechanism.
Figure 2:
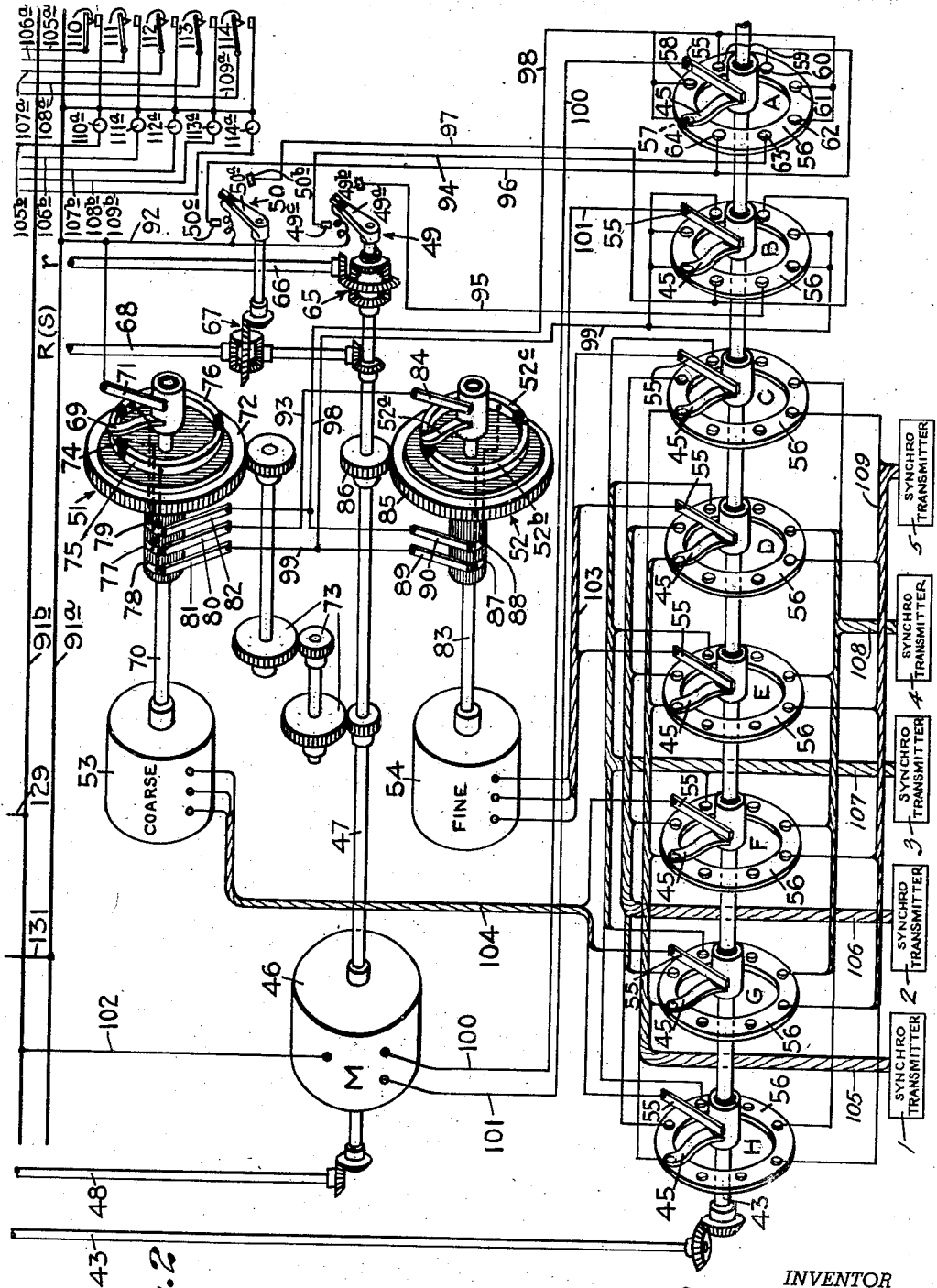
Fig. 2 shows the balance of the selector switch, the receiver motors and the follow-up controls and motor.

The record sheet 1 is mounted on a frame 2 over which it is moved upward at a constant speed by a motor 3. The motor 3 is connected to the paper drive roller 4 by gears 5, shaft 6, and gears 7. A pressure roller 8 holds the record sheet or paper 1 against the drive roller 4 because of springs 9, which act on pivoted arms 10 on which the pressure roller 8 is mounted. The paper is supplied from a feed roller 11.

The recorder consists of a rotary printing wheel 12 which carries a plurality of characters 13. The wheel 12 is mounted on a bifurcated arm 14 which is pivoted about a splined shaft 15 extending across the lower edge of the record sheet 1. The printing wheel 12 is secured to rotate with a gear 16, which is driven by a gear 17 splined on the shaft 15 so that rotation of the shaft turns the wheel 12 a corresponding amount. The arm 14 and the shaft 15 are supported by arms 18 extending from a threaded block 19 mounted to slide across the paper in a guide rail 20. A screw shaft 21 is threaded through the block 19 so that rotation of the shaft 21 causes traverse of the block 19 and the recorder wheel 12 relative to the record sheet 1. An inking wheel 22 is provided to engage and ink the characters 13 as the printing wheel 12 rotates.

The bifurcated arm 14 carries an extension 23 extending in the opposite direction from the wheel 12 so that a spring 24 between the extension 23 and one of the arms 18 acts to hold the printing wheel 12 out of engagement with the record sheet 1. The lower side of the extension 23 is held by the spring in contact with a bar 25 which is mounted on two levers 26 secured on a shaft 27 which is pivoted at each end in bearings 28 extending from the frame 2. One of the levers 26 has an extension 29 to which is pivoted the plunger 30 of a printing solenoid 31. When the solenoid is energized, as will be explained later, the printing wheel will be brought into contact with the record sheet 1.

The shaft 6 carries a cam 32 which actuates a time pencil or marker 33 mounted on an arm 34 pivoted on a bracket 35 extending from the frame 2. One end of a link 36 is connected to the arm 34 and the other end bears against the face of the cam 32. A spring 37 connects the arm 34 and a bracket 38 extending from the frame 2. The upper end of bracket 38 guides the end of the link 36 which bears against the cam 32. The cam 32 rotates clockwise as indicated by the arrow and has a notch 39 which permits the spring 37 to move the time pencil 33 to the right once during each revolution of the cam 32. A time line 40 is thus made on the record sheet with jogs 41 in the line corresponding to the unit of time required for one revolution of the cam 32.

The constant speed motor 3, through the shaft 6 and a slip coupling 42, applies a torque to the shafting 43 which drives the printing wheel 12 through the splined shaft 15, a detent wheel 44 and the contact arms 45 of the selector switch units to be hereinafter described.

The screw shaft 21 is driven by a range servomotor 46 through shafts 47 and 48. The motor 46 is energized by mechanically actuated controls 49 and 50 or by a coarse control 51 and a fine control 52 actuated by a coarse receiver motor 53 and fine receiver motor 54, respectively, which receiver motors constitute the receiver of a data transmission system.

The servomotor 46 is selectively connected to one of the mechanically actuated controls 49 or 50 or the coarse and fine controls 51 and 52 by units A and B of the selector switch. Units C, D, E, F, G and H of the selector switch serve to connect the coarse and fine receiver motors 53 and 54 to each of a plurality of pairs of coarse and fine transmitter units, not shown, as will be explained hereinafter.

Each unit of the selector switch consists of a contact arm 45 mounted on a hub which acts as a slip ring insulated from but secured to rotate with shafting 43, a brush 55 contacting the slip ring and a stationary ring 56 of insulating material supporting equally spaced contact buttons 57, 58, 59, 60, 61, 62, 63 and 64 as designated by numerals applied to unit A. The corresponding contact buttons of each unit are successively engaged by the contact arms 45 as they rotate with the shafting 43.

The mechanically actuated control 49 consists of a movable contact arm 49a carrying an insulated contact on its end, and two fixed contacts 49b and 49c with which the contact on arm 49a engages when it is moved from its central or neutral position in one direction or the other. The contact arm 49a is actuated by one member of a differential 65. The two other members of differential 65 are connected respectively to shaft 47 and a shaft 66, which is driven in accordance with present range as determined by a computer mechanism, not shown.

The control 50 is similar in all respects to the control 49 and includes a contact arm 50a and fixed contacts 50b and 50c. The arm 50a is actuated by one member of a differential 67 the two other members of which are connected respectively to shaft 47 and a shaft 68, which is driven in accordance with the advance range as determined by the computer mechanism.

The coarse control 51 and the fine control 52 are of the follower type, that is, the primary rotary element is connected to be turned by the signal or corresponding receiver motor and the follower or response element is connected to the controlled servo motor and is driven thereby in one direction or the other to maintain or bring about agreement in the angular positions of the primary and follower elements.

The coarse control 51 includes a contact arm 69 and hub or slip ring insulated from but rotatably secured on the coarse receiver motor shaft 70. A fixed brush 71 engages the slip ring to energize the contact arm 69. The follower element is rotatably mounted on shaft 70 and includes a gear 72 by which it is driven from the motor 46 through the shaft 47 and reduction gearing 73. Mounted on gear 72 but insulated therefrom and from each other are three contact segments 74, 75 and 76 positioned so as to be engaged by the contact arm 69. The angular length of segment 74 is determined by the ratio of the reduction gear 73 and is such that the contact arm remains engaged with segment 74 throughout about two-thirds of a revolution of the fine control 52. The segments 75 and 76 are of equal length and complete the circumference so that arm 69 engages one or the other as soon as it passes off of segment 74. The gear 72 also supports insulated slip rings 77, 78 and 79 which are electrically connected to segments 74, 75 and 76 respectively as indicated by dotted lines. The slip rings 77, 78 and 79 are engaged by fixed brushes 80, 81 and 82, respectively.

The fine control 52 is similar in construction to coarse control 51 except that contact arm 52a is mounted on the fine receiver motor shaft 83 and is engaged by a fixed brush 84. The gear 85 of the follower member is driven directly by shaft 47 by a gear 86. The gear 85 mounts two segments 52b and 52c each of substantially 180° extent. Two slip rings 87 and 88 are electrically connected to the segments 52b and 52c respectively and brushes 89 and 90 engage slip rings 87 and 88 respectively.

The contact arms 49a and 50a and the brush 71 are connected to one side 91a of a power supply by a conductor 92. Brush 80 is connected to brush 84 by a conductor 93. Contact 49c is connected by a conductor 94 to contact button 63 of unit A and contact 49b is connected by a conductor 95 to the corresponding contact button of unit B. Contact 50c is connected by a conductor 96 to contacts 60 and 64 of unit A and contact 50b is connected by a conductor 97 to the corresponding contact buttons of unit B. Segment 52c is connected through slip ring 88, brush 90 and a conductor 98 to brush 82 and contact buttons 57, 58, 59, 61 and 62 of unit A. Segment 52b is similarly connected by conductor 99 to brush 81 and the corresponding contact buttons of unit B. Brushes 55 of units A and B are connected to the directional terminals of servomotor 46 by conductors 100 and 101, respectively. The common terminal of motor 46 is connected by conductor 102 to the side 91b of the power supply.

The three control terminals of fine receiver motor 54 are connected to the brushes 55 of units C, D and E, respectively, by a cable 103 and the three terminals of coarse receiver motor 53 are connected to the brushes 55 of units F, G and H, respectively, by a cable 104.

The pairs of coarse and fine transmitters, not shown, at the several observing stations, for example five, are connected to the contact buttons of units C, D, E, F, G and H by means of cables 105, 106, 107, 108 and 109, each cable containing six conductors. The corresponding conductors from each of the fine transmitters, are connected to contact buttons on units C, D and E, respectively, and the corresponding conductors from each of the coarse transmitters, are connected to contact buttons on units F, G and H, respectively. The six conductors of cable 105 are connected to the contact buttons 57 of the several units. Similarly the conductors of cables 106, 107, 108 and 109 are connected to buttons 58, 59, 61 and 62 of the several units.

The contact buttons 57, 58, 59, 61 and 62 of unit I of the selector switch are connected to conductors 105a, 106a, 107a, 108a and 109a which lead to one side of push buttons 110, 111, 112, 113 and 114, respectively, located at the observing stations where the transmitters connected to cables 105, 106, 107, 108 and 109 are located. The second side of push buttons 110, 111, 112, 113 and 114 is each connected to the side 91a of the power supply. The corresponding contact buttons of unit J are connected by conductors 105b, 106b, 107b, 108b and 109b to one side of signal devices 110a, 111a, 112a, 113a and 114a located at the correspondingly numbered push buttons. The second side of the signal devices is each connected to the side 91a of the power supply. The signal devices may be in the form of lights, annunciators or buzzers.

The contact buttons on units C, D, E, F, G and H corresponding to buttons 60, 63 and 64 of unit A are not used as there are no transmitters corresponding to those positions of the contact arms 45.

The brush 55 of unit I is connected by conductor 115 to one side of the winding of a selector solenoid 116, the plunger 117 of which is effective to engage a notch of the detent wheel 44 when the solenoid is energized. When the solenoid 116 is not energized the plunger 117 is held out of engagement with the wheel by gravity or otherwise. The second side of the solenoid winding is connected by a conductor 118 to a fixed contact 119 of a delayed action relay 120. The conductor 115 is also connected to one side of the solenoid 121 of the delayed action relay 120.

The delayed action relay 120 includes the solenoid 121 and an associated plunger 122 the upper end of which is connected to a dash pot 123 or other means to delay the effect of the solenoid in causing movement of the plunger. The plunger actuates two movable contacts 124 and 125 which are held in an up position by the spring 126 when the solenoid is not energized.

The movable contact 124 in its up position engages the fixed contact 119 and in its down position engages a fixed contact 127. The movable contact 125 is disengaged in its up position and engages a fixed contact 128 in its down position. The movable contacts 124 and 125 are connected by a conductor 129 to the side 91b of the power supply. The fixed contact 127 is connected by a conductor 130 to one side of the printing solenoid 31. The second side of the solenoid 31 is connected by a conductor 131 to side 91a of the power supply. The fixed contact 128 is connected by a conductor 132 to the brush 55 of unit J.

A branch of conductor 131 is connected to the two contact buttons on unit I which correspond to buttons 60 and 63 of unit A. Another branch of conductor 131 leads to a fixed contact 133 of a holding relay 134 and a movable contact 135 of the holding relay is connected by a conductor 136 to the contact button of unit I which corresponds to button 64 of unit A. The contact 135 is mounted on a lever 137 pivoted at the point 138 and biased by a spring 139 to hold the contact 135 out of engagement with the contact 133. The lower end of the lever 137 engages the free end of a second pivoted lever 140 to hold it down against the tension of a spring 141 when the contacts 133 and 135 are disengaged. The levers are further arranged so that when the contact 135 is pressed into engagement with the contact 133 the lever 140 will be moved up under the effect of the spring 141 and the end of the lever 140 will engage the end of the lever 137 to hold the contacts in engagement (see Fig. 3) until a plunger 142 connected to the lever 140 is pulled downward against the tension of the spring 141 by the energization of a solenoid 143 surrounding the plunger. One side of the solenoid 143 is connected to the conductor 131 and the other side is connected by a conductor 144 to the contact button of unit J corresponding to the button 64 of unit A. The push buttons 110, 111, 112, 113 and 114 may be of this holding type if desired.

A speed actuated switch 145 is mechanically connected to the shaft 48 by gears 146. The switch consists of a centrifugal speed measuring device 147 coacting with a movable contact 148 to cause engagement of the contact 148 with a fixed contact 149 when the speed of the shaft 48 is below a predetermined value and to disengage the contacts 148 and 149 when the speed exceeds the predetermined value. The movable contact 148 is connected to a branch of the conductor 129 and the fixed contact 149 is connected by a conductor 150 to one side of the solenoid 121. The other side of the solenoid 121 is connected to the conductor 115.

For the purpose of identification the synchronous transmitters at the range finder stations connected to the recording mechanism by the cables 105, 106, 107, 108 and 109 are designated by the numerals "1," "2," "3," "4" and "5" respectively. The computed range represented by the shaft 66 is designated as "r" and the computed advance range represented by shaft 68 is designated as "R" while the selected or salvo range is designated as "S."

As the motor 3 operates to move the record sheet up the torque of the coupling 42 will tend to rotate the contact arms 45 of the selector units clockwise as viewed in the drawings. The contact arms 45 as shown in engagement with the contact buttons 57 are in position to record the range of range finder 1. As the contact arms 45 rotate clockwise they successively engage the contact buttons representing the range finders 1, 2 and 3, the advance range "R," the range finders 4 and 5, the present range r, the salvo range S and then the cycle is repeated.

To illustrate the operation of the selector mechanism the push button 110 is shown in its closed position. This has resulted in the plunger 117 locking the detent wheel in the position to hold the contact arms 45 in engagement with the contact buttons 57. This locking circuit is from the side 91a of the power supply to push button 110, conductor 105a, contact button 57 of unit I, contact arm 45 and brush 55 of unit I, conductor 115, solenoid 116, conductor 118, contact 119, contact 124, and conductor 129 back to the side 91b of the power supply. It will be seen that this circuit from the push button 110 can only be completed when the contact arms 45 are rotated into engagement with the contact buttons 57 of the selector switch. The solenoid 116 is then energized and the plunger locks the selector switch in this position until the recording cycle for this station is completed.

As soon as the selector switch has come to this position the receiver motors 53 and 54 are connected through units C, D, E, F, G and H to the transmitters at the range finder 1 represented by push button 110 and the rotors of the receiver motors turn to a position representing the transmitted range. Unless the range servomotor 46, the connected gearing and the block 19 carrying the printing wheel 12 are already in a position in agreement with the transmitted range the motor 46 will be energized by the controls 51 and 52 and will turn to come into agreement with the transmitted range. The motor 46 in running to reposition the block 19 will quickly exceed the speed necessary to open the contacts 148 and 149 of the speed actuated switch 145 so that although initially a circuit was closed from the conductor 115 through the solenoid 121, conductor 150, contacts 149 and 148, and conductor 129, this circuit is broken by the opening of contacts 148 and 149 before the solenoid 121 becomes effective to pull the plunger 122 down to open the contacts 119 and 124 and thereby deenergize the locking solenoid 116.

As soon as the motor 46 has come into agreement with the received range the motor will either stop or at least will slow down to where the contacts 148 and 149 will again close and remain closed long enough for the solenoid 121 to be effective to shift the contacts 124 and 125 to their lower position.

The engagement of the contact 124 with the contact 127 closes a circuit from the side 91a of the power supply through the conductor 131, printing solenoid 31, conductor 130, contact 127, contact 124 and the conductor 129 back to the side 91b of the power supply. Upon energization of the solenoid 31 the printing wheel 12 is forced into engagement with the paper to record the numeral "1" in a position representing the range received by the repeater unit. It will be understood that the characters on the printing wheel 12 are arranged so that as the wheel is rotated in unison with the selector switch the character in position to print will agree with the position of the selector arms 45.

The engagement of the contact 125 with the contact 128 closes a circuit from the side 91b of the power supply, through the conductor 129, contact 125, contact 128, conductor 132, brush 55 and contact arm 45 of unit J, contact button 57 of unit J, conductor 105b and signal 110a back to the side 91a of the power supply. This circuit actuates the signal 110a of the station 1 where the push button 110 was closed and so indicates to the operator there that the range transmitted from that station has been recorded.

The opening of the circuit through contacts 119 and 124 deenergizes the solenoid 116 and permits the plunger 117 to drop out of engagement with the detent wheel 44, whereupon the selector switch rotates under the influence of the slip coupling 42 until it is stopped again at a selected position by the energization of the solenoid 116.

The operation cycle is the same when each of the buttons 111, 112, 113 or 114 is closed except that the selector switch arms 45 stop in engagement with contact buttons 58, 59, 61 or 62 respectively.

The contact buttons 60 and 63 of unit I are permanently connected by the conductor 131 to the side 91a of the power supply. The effect of this connection is to stop the selector switch arms in engagement with these buttons each revolution while the range values of advance range R and present range r represented by the shafts 66 and 68 respectively are recorded. In these positions the range servomotor 46 is placed under control of the mechanically actuated controls 50 or 49 instead of the coarse and fine receiver controls 51 and 52. Therefore no circuits are completed through units C, D, E, F, G and H. Likewise no circuit is closed through unit J for these positions as there is no need for a signal to indicate at a distance that the value has been recorded. While these contact buttons 60 and 63 are shown as permanently connected to the conductor 131 they may be connected through push buttons such as the push button 110, a holding contact such as holding relay 134 or a simple two position switch by which the circuits may be opened or closed at will.

To record the salvo range S the movable contact 135 of the holding relay 134 is pressed into engagement with the fixed contact 133. The interlocking of the levers 137 and 140 holds these contacts in engagement until the selector switch arms 45 come to the contacts 64 on which they are stopped while the advance range represented by the shaft 68 is recorded. When the recording is completed the circuit through the button 64 of unit J is completed to the solenoid 143 to pull the lever 140 down so that the lever 137 is free to return the contact 135 to its disengaged position.

The record shown in Fig. 1, starting from the top down shows that the selector switch stopped at all positions during its first revolution and therefore recorded the ranges corresponding to stations 1, 2, 3, R, 4, 5, r and S. During the second revolution it stopped only at positions representing stations 3, R, 5 and r. During the third revolution it stopped only at positions 1, 2, R, 4, r and S. During the fourth revolution it stopped at all positions the same as during the first revolution.

It is evident that various modifications are possible from the embodiment of the invention illustrated without departing from the invention as defined in the claims, for example all of the values to be recorded may be received electrically or all may be received mechanically, or other forms of data transmission may be utilized. The push buttons may all be of the holding type and other forms of recorders may be employed or the data from the selected station may merely actuate an indicator or position a member in accordance with the selected data.

I claim:

1. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, continuous torque applying means connected to drive the switch, a plurality of circuit selecting means corresponding respectively to the plurality of electrical circuits, and torque opposing means effective upon actuation of any one of the circuit selecting means to stop rotation of the switch at the position to connect the receiver unit to the circuit corresponding to the selecting means actuated.

2. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, continuous torque applying means connected to drive the switch, a plurality of circuit selecting means corresponding respectively to the plurality of circuits, torque opposing means effective upon actuation of the circuit selecting means to stop rotation of the switch progressively in positions to connect the receiver unit successively to the electrical circuits corresponding to the selecting means actuated, a circuit indicator actuated in accordance with the position of the switch, and a member positioned by the element of the receiver unit in accordance with the current carried by the successively connected circuits.

3. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, continuous torque applying means connected to drive the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, a member positioned by the element of the receiver unit in accordance with the current carried by the selected circuit, and means to maintain the torque opposing means effective during positioning of the member.

4. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, continuous torque applying means connected to drive the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, a movable member, a servomotor connected to drive the member, and a control for the servomotor actuated by the element of the receiver unit and the servomotor to position the member in accordance with the current carried by the selected circuits.

5. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, continuous torque applying means connected to drive the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, a movable member, a servomotor connected to drive the member, a control for the servomotor actuated by the element of the receiver unit and the servomotor to position the member in accordance with the current carried by the selected circuit, and means driven by the servomotor to maintain the torque opposing means effective during rotation of the servomotor.

6. In combination with a plurality of electrical circuits carrying variable currents representing positional data, a receiver unit having an element positioned in accordance with the current supplied thereto, a servomotor, a servomotor control actuated differentially by the element of the receiver unit and the servomotor, a rotatable shaft, a second servomotor control actuated differentially by the shaft and the servomotor, a multiple position switch including positions for connecting the receiver unit selectively to each of the electrical circuits and for simultaneously connecting the servomotor to be controlled by the first mentioned servomotor control, the said switch also including a position for connecting the servomotor to be controlled by the second servomotor control, torque applying means effective to urge rotation of the switch, a plurality of selecting means corresponding respectively to the plurality of positions of the switch, and torque opposing means effective upon actuation of one of the selecting means to stop rotation of the switch at the position corresponding to the selecting means actuated.

7. In combination with a plurality of electrical circuits carrying variable currents representing positional data, a receiver unit having an element positioned in accordance with the current supplied thereto, a servomotor, a servomotor control actuated differentially by the element of the receiver unit and the servomotor, a plurality of rotatable shafts, a plurality of servomotor controls each actuated differentially by the servomotor and one of the shafts, a multiple position switch including positions for connecting the receiver unit selectively to each of the electrical circuits and for simultaneously connecting the servomotor to be controlled by the first mentioned servomotor control, said switch including other positions for connecting the servomotor to be controlled selectively by each of the plurality of servomotor controls, torque applying means connected to drive the switch, a plurality of selecting means corresponding to the plurality of positions of the switch, and torque opposing means effective upon actuation of one of the selecting means to stop rotation of the switch at the position corresponding to the selecting means actuated.

8. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, torque applying means connected to drive the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, indicator means having a plurality of characters each corresponding to one of the positions of the switch, means driving the switch and the indicator means in unison to place the character corresponding to the selected switch position in position for indicating, and means actuated by the element of the receiver unit to move the indicating means to a position representing the current carried by the selected circuit.

9. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, torque applying means connected to drive the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, indicating means having a plurality of characters each corresponding to one of the positions of the switch, means driving the switch and the indicating means in unison to place the character corresponding to the selected switch position in position for recording, means actuated by the element of the receiver unit to move the indicating means to a position representing the current carried by the selected circuit, and means to actuate the indicating means to record its position.

10. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, torque applying means effective to urge rotation of the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, indicating means having a plurality of characters each corresponding to one of the positions of the switch, means driving the switch and the indicating means in unison to place the character corresponding to the selected switch position in position for indicating, means actuated by the element of the receiver unit to move the indicating means to a position representing the current carried by the selected circuit, and means controlled by said last means to maintain the torque opposing means effective during movement of the indicating means.

11. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, torque applying means effective to urge rotation of the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, indicating means having a plurality of characters each corresponding to one of the positions of the switch, means driving the switch and the indicating means in unison to place the character corresponding to the selected switch position in position for recording, means actuated by the element of the receiver unit to move the indicating means to a position representing the current carried by the selected circuit, means controlled by said last means to maintain the torque opposing means effective during movement of the indicating means, and means controlled by the last mentioned means to actuate the indicating means to record its position upon cessation of movement of the indicating means.

12. In combination with a plurality of electrical circuits carrying variable currents representing positional data, a receiver unit having an element positioned in accordance with the current supplied thereto, a multiple position rotary switch, each position of the switch being effective to connect one of the circuits to the receiver unit, torque applying means connected to drive the switch, a plurality of circuit selecting means corresponding respectively to the plurality of electrical circuits, said circuits selecting means including cooperative contacts, torque opposing means effective upon engagement of the contacts of one of the circuit selecting means to lock the switch against rotation at the position to connect the receiver unit to the circuit corresponding to the selecting means actuated, a member moved by the element of the receiver unit to a position in accordance with the current carried by the selected circuit, and means associated with the member to unlock the switch upon cessation of movement of the member.

13. In combination with a plurality of electrical circuits carrying variable currents representing positional data, a receiver unit having an element positioned in accordance with the current supplied thereto, a multiple position rotary switch, the switch being effective in each position to connect one of the circuits to the receiver unit, torque applying means effective to urge rotation of the switch, a plurality of circuit selecting means corresponding respectively to the plurality of electrical circuits, torque opposing means effective upon actuation of any one of the circuit selecting means to stop rotation of the switch at the position to connect the receiver unit to the circuit corresponding to the selecting means actuated, a member moved by the element of the receiver unit to a position in accordance with the current carried by the selected circuit, a signal device associated with each circuit selecting means, and means associated with the member to maintain the torque opposing means effective during movement of the member and to actuate the signal device associated with the selecting means upon cessation of movement of the member.

GEORGE A. CROWTHER.

REFERENCES CITED

The following references are of record in the file of this patent:

UNITED STATES PATENTS

| Number | Name | Date |
|---|---|---|
| 1,800,019 | Hewett | Apr. 7, 1931 |
| 2,295,533 | Leathers | Sept. 15, 1942 |
| 2,207,344 | Fairchild | July 9, 1940 |
| 1,674,411 | Ostline | June 19, 1928 |
| 2,313,752 | Le Clair | Mar. 16, 1943 |
| 1,784,651 | Anderson | Dec. 9, 1930 |
| 2,207,343 | Fairchild | July 9, 1940 |
| 2,027,945 | Widmer | Jan. 14, 1936 |
| 2,001,124 | Cooke | May 14, 1935 |
| 1,660,886 | Randall | Feb. 28, 1928 |
| 1,965,393 | Schleicher | July 3, 1934 |
| 2,207,743 | Larson | July 16, 1940 |